Feb. 18, 1930.  D. H. BOTTRILL  1,747,419
SOLDERING DEVICE
Filed May 28, 1927

INVENTOR
DAVID.H.BOTTRILL
BY Fetherstonhaugh & Co
ATTORNEYS

Patented Feb. 18, 1930

1,747,419

UNITED STATES PATENT OFFICE

DAVID HUGHES BOTTRILL, OF POINTE CLAIRE, QUEBEC, CANADA, ASSIGNOR TO DRYSDALE AND PEASE, A PARTNERSHIP CONSISTING OF WILLIAM F. DRYSDALE AND E. RAYMOND PEASE, OF MONTREAL, CANADA

SOLDERING DEVICE

Application filed May 28, 1927. Serial No. 194,968.

This invention relates to improvements in welding apparatus, the object being to provide a convenient form of cartridge containing a fusible metal adapted to form the selected welding material, and an exo-thermic compound or material surrounding the fusible metal, adapted to melt said fusible metal and permit the molten metal to flow into position to perform the necessary welding operation.

My invention consists, essentially, in providing a cartridge comprising, a suitable container adapted to hold an exo-thermic mixture, such as thermit. This container is placed within an outer shell or other container of refractory, or other suitable material. Within the outer container there is a second container or crucible adapted to contain a selected alloy or fusible metal, which, upon being melted, flows into position for welding or soldering the metal pieces. The cartridge is provided with means for igniting the exo-thermic compound, and provision is made to retain the fusible alloy within its container, until a satisfactory temperature has been reached before allowing it to flow to the point where it may be used.

In the drawings which show one form of my invention:

Figure 1:
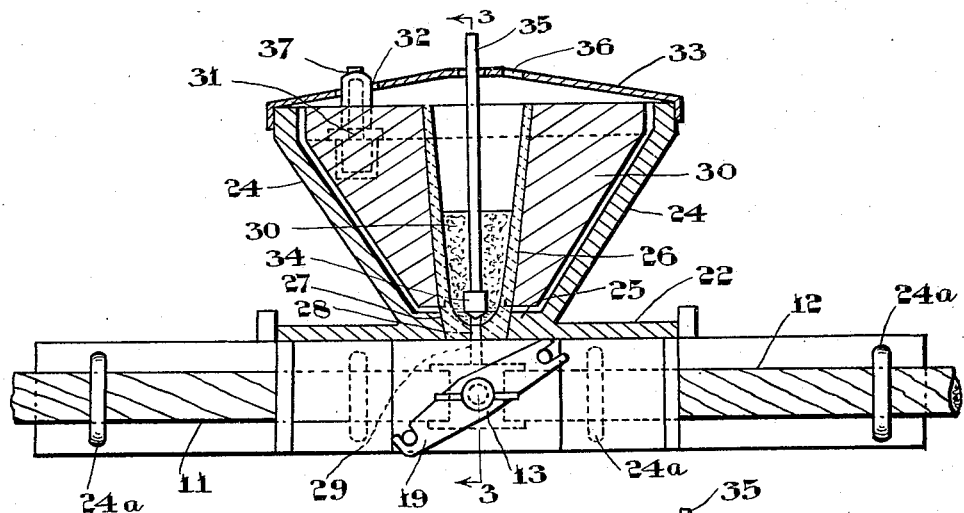
Figure 1 is a sectional side elevation of a welding apparatus with means for holding the parts to be welded together until the weld is made.
Figures 3, 4:
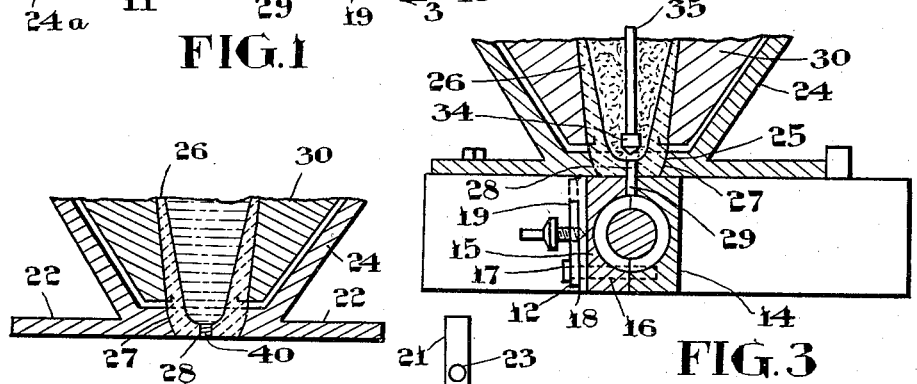
Figure 3 is a sectional end elevation taken on the line 3—3 Figure 1.
Figure 4 is a part sectional elevation showing a modified type of plug for the inner crucible.
Figure 2:
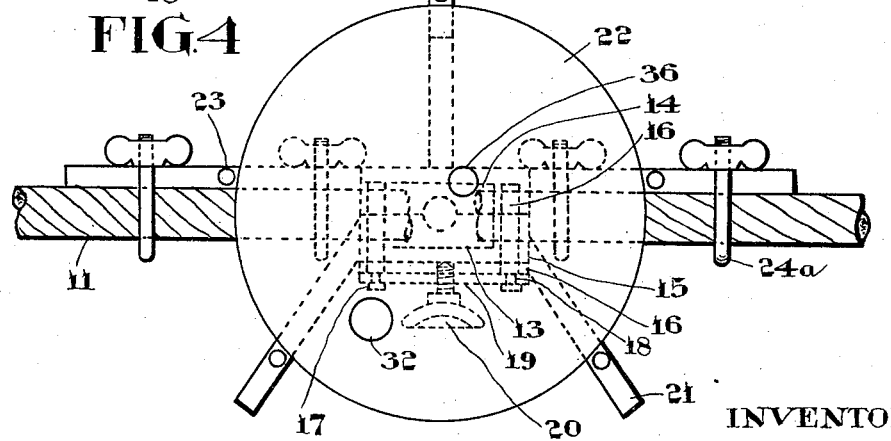
Figure 2 is a plan view of the welding apparatus shown in Figure 1.

Referring more particularly to the drawings, 11 and 12 designate the articles to be welded together, which may be piping, cables, wires, or the like, the adjacent faces of which are shown spaced from one another and positioned within the chamber 13 formed between the sections 14 and 15 of a split mould. Guide pins 16 extend out from one side of the portion 14 and pass through apertures formed in the part 15. The ends 17 of the guide pins are provided each with a groove 18 to receive the slotted ends of a locking lever 19, which is provided with a screw 20, which when adjusted presses the sections of the mould together. The sections have radially extending arms 21 which have upwardly extending guide pins 23 adapted to position the plate 22. The articles to be welded which, for illustrative purposes are shown as cables, may be held in position by means of the adjustable clamps 24ª, the ends of which are threaded and pass through the arms 21. Thumb nuts may be provided to draw the clamps into cable engaging position. Mounted on the plates 22 is a container or crucible 24 of refractory or other suitable material, and fitting into the bottom 25 of the crucible 24, is a second container or crucible 26, which fits into a seat 27. The container 26 is provided with an aperture 28 which registers with an aperture 29 formed in the upper parts of the mould and communicates with the chamber 13. A cartridge 30 of exo-thermic material is placed between the outer wall of the container 26 and the inner wall of the container 24. The cartridge is provided with an igniter 31, which extends through an aperture 32 formed in the cover 33, which fits over the crucible 24. A needle valve 34 fits over the aperture in the bottom of the container 26 and the valve spindle 35 extends through a suitable opening in the cover. A sight hole 36 is provided in the cover to allow the operator to observe the condition of the fusible metal within the container 26.

In operation the cables, pipes, wires, or the like, are clamped in position with their ends protruding into the chamber formed in the mould, the portions of which are drawn together by means of the thumb screw and locking levers. The inner container is filled with a quantity of the metal with which it is desired to form a weld, or joint, between the ends of the cable. The cartridge is placed within the outer container and the cover placed in position with the igniter extending therethrough. The igniter is covered with a suitable guard 37, which may be also used as a striker for setting the fuse or igniter in action. The igniter when fired sets up a chemical reaction between the ingredients which form the exo-thermic material, so that extreme heat is generated in the space surrounding the inner crucible and causes the fusible material within the inner crucible to melt. The metal is retained within the inner crucible until the desired temperature has been attained which will give the best results for welding or soldering the ends of the cable together. The valve is then pulled clear of the aperture at the bottom of the inner crucible and the metal is allowed to flow into the mould to form a solid joint between the ends of the cable when the metal has cooled. It will be readily understood that modifications may be made in the general construction of the device without departing from the spirit of the invention.

The cartridge is preferably attached to the inner crucible, if so desired, by any suitable means and the cartridge may be filled with exo-thermic mixtures, such as thermit. The outer crucible is made of metal which will not be materially affected by the heat generated by the exo-thermic mixture. The inner crucible or container which holds the fusible metal may be made of baked clay or such like material.

The device is very simple in operation and forms a convenient means for forming a solid joint between the ends of any class of material which it is desired to join together. The cartridges are easily carried and placed in position. It has been found that a device of this nature simplifies the joining of the ends of cables, pipes, and the like, together where the working space is limited.

To simplify the construction, the valve and rod may be dispensed with, and a fusible plug 40 may be placed in the aperture 28. The plug may be made of metal which will fuse at a much higher temperature than the metal in the inner crucible, so that the plug before fusing will hold the alloy in the crucible until it has attained the necessary temperature to cause it to flow through the aperture 28 into the mould to form a solid joint between the ends of the cable.

Having thus described my invention, what I claim is:—

1. In a welding apparatus, a heat generating cartridge, consisting of a solidified exothermic mixture preformed to fit around a crucible in which the fusible welding metal is placed.

2. In a welding apparatus, a heat generating cartridge consisting of a solidified exothermic mixture preformed to fit around a crucible in which the fusible welding metal is placed and an ignitor carried by said cartridge.

3. A welding apparatus including a crucible for containing the fusible welding metal, a heat generating cartridge consisting of an exo-thermic mixture surrounding said crucible and an outer refractory casing enclosing said mixture.

4. A welding apparatus including a crucible for containing a fusible welding metal, a heat generating cartridge consisting of an exo-thermic mixture surrounding said crucible, an outer casing containing the crucible and the mixture and means covering both the crucible and the outer casing.

5. A welding apparatus including a crucible for containing a fusible welding metal, a heat generating cartridge consisting of an exo-thermic mixture surrounding the crucible, an outer refractory casing containing the crucible and the mixture, a lid covering both the crucible and the casing and an ignitor carried by the cartridge and projecting outwardly through an opening in said lid.

6. In a welding apparatus of the character described a unit consisting of a crucible adapted to contain a fusible welding metal and provided with a normally closed outlet through which the welding metal is permitted to escape when melted for use and an attached heat generating cartridge consisting of an exo-thermic mixture surrounding said crucible and secured thereto.

7. In a welding apparatus the combination with a mold in which the parts to be welded are placed, of an outer refractory casing, a crucible for containing the fusible welding metal adapted to be placed in said casing and having a normally closed outlet through which the fusible welding metal is permitted to flow into the mold when said metal is heated to a molten condition, and a heat generating cartridge consisting of an exo-thermic mixture contained in the casing and closely surrounding said crucible.

In witness whereof, I have hereunto set my hand.

DAVID HUGHES BOTTRILL.